(12) United States Patent
Yano et al.

(10) Patent No.: US 12,367,535 B2
(45) Date of Patent: Jul. 22, 2025

(54) COMMUNITY EVALUATION SYSTEM, COMMUNITY EVALUATION METHOD, BEHAVIOR EVALUATION SYSTEM, AND BEHAVIOR EVALUATION METHOD

(71) Applicant: Hitachi, Ltd., Tokyo (JP)

(72) Inventors: Kojin Yano, Tokyo (JP); Kei Suzuki, Tokyo (JP); Satoru Hori, Tokyo (JP); Tomoichi Ebata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 233 days.

(21) Appl. No.: 18/018,591

(22) PCT Filed: Mar. 1, 2021

(86) PCT No.: PCT/JP2021/007607
§ 371 (c)(1),
(2) Date: Jan. 30, 2023

(87) PCT Pub. No.: WO2022/044381
PCT Pub. Date: Mar. 3, 2022

(65) Prior Publication Data
US 2023/0206370 A1    Jun. 29, 2023

(30) Foreign Application Priority Data
Aug. 31, 2020  (JP) .................. 2020-145591

(51) Int. Cl.
*G06Q 10/10* (2023.01)
*G06Q 10/06* (2023.01)
(Continued)

(52) U.S. Cl.
CPC .................. *G06Q 50/26* (2013.01)

(58) Field of Classification Search
CPC ............... G06Q 50/26; G06Q 10/0639; G06Q 30/0201; G06Q 50/01
(Continued)

(56) References Cited

U.S. PATENT DOCUMENTS

2017/0364580 A1    12/2017  Ishitobi
2018/0183776 A1     6/2018  Chander et al.

FOREIGN PATENT DOCUMENTS

JP    2017-228004 A    12/2017
JP    2018-106669 A     7/2018

OTHER PUBLICATIONS

Extended European Search Report received in corresponding European Application No. 21860813.1 dated Sep. 11, 2024.
(Continued)

*Primary Examiner* — Jonathan P Ouellette
(74) *Attorney, Agent, or Firm* — MATTINGLY & MALUR, PC

(57) ABSTRACT

A community evaluation system includes: effect model construction units and that construct, based on activity information data, history data, and communication history data, an effect model indicating a process in which a specific activity of a first community is reflected in communication in a network community and the communication in the network community is reflected in an activity of a second community; and an effect model evaluation unit that calculates an evaluation value of the process in the effect model, based on a size and a delay of a connection between the specific activity of the first community and the communication in the network community, and a size and a delay of a connection between the communication in the network community and the activity of the second community.

6 Claims, 14 Drawing Sheets

(1) PLANNING STAGE          (2) PREPARATION STAGE          (3) ON DAY OF FESTIVAL          (4) THEREAFTER

(51) Int. Cl.
  *G06Q 30/02* (2023.01)
  *G06Q 30/06* (2023.01)
  *G06Q 50/26* (2012.01)

(58) Field of Classification Search
  USPC .................................................. 705/1.1–912
  See application file for complete search history.

(56) References Cited

OTHER PUBLICATIONS

Li, Chao et al., "Info-Cluster Based Regional Influence Analysis in Social Networks", Advances in Knowledge Discovery and Data Mining. PAKDD 2011, Lecture Notes in Computer Science, May 24, 2011, pp. 87-98, Springer, Berlin, Heidelberg.
International Search Report of PCT/JP2021/007607 dated Apr. 13, 2021.

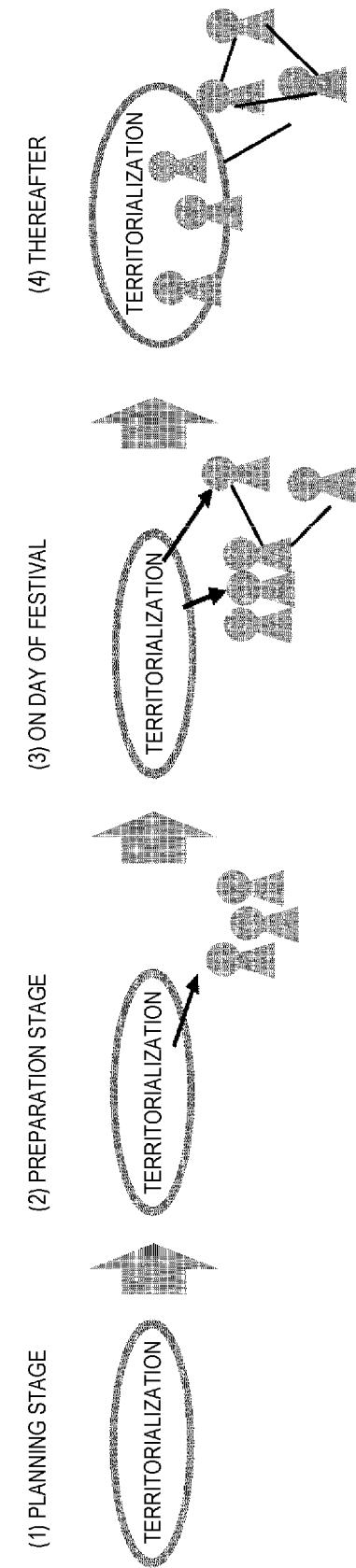
[FIG. 1]

[FIG. 2]
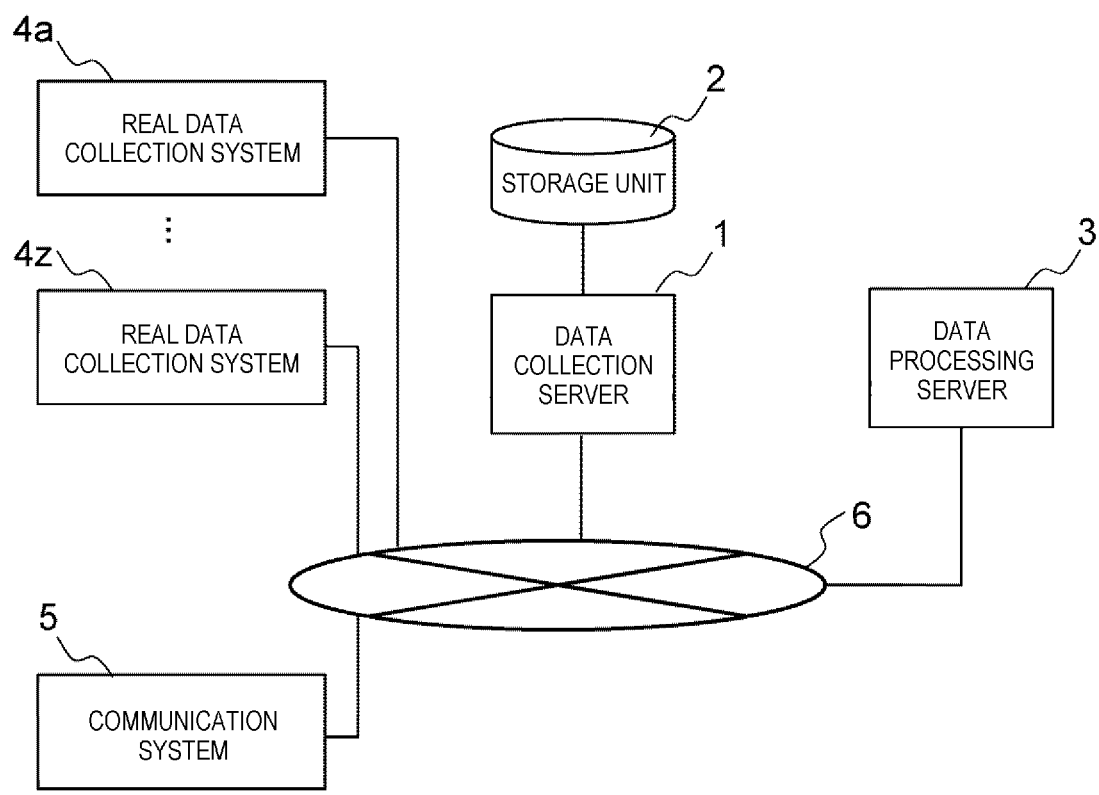

[FIG. 3]
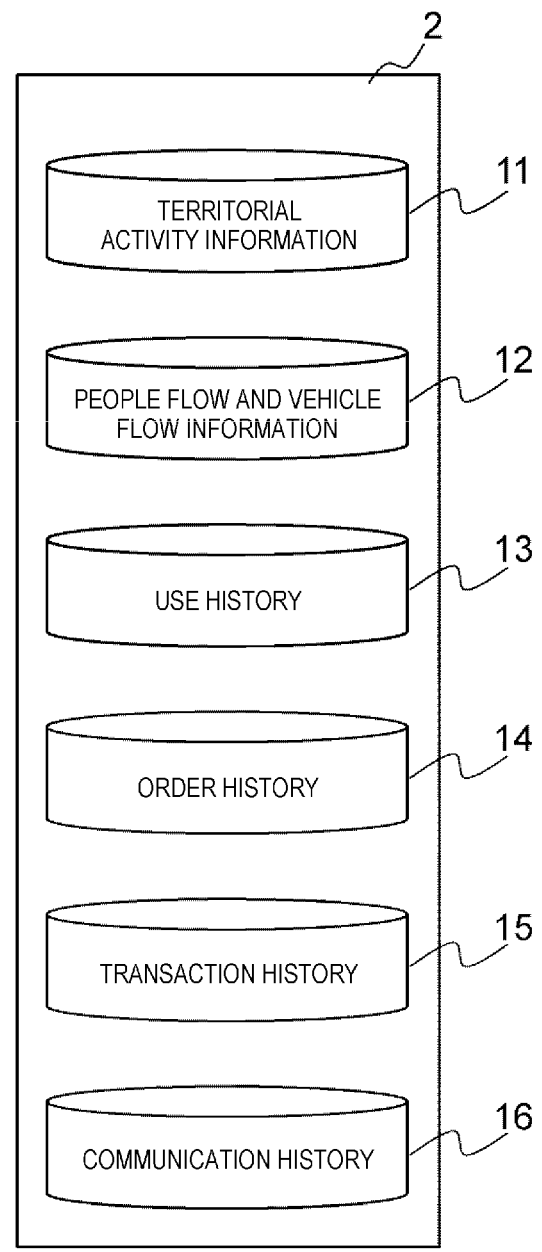

[FIG. 4]
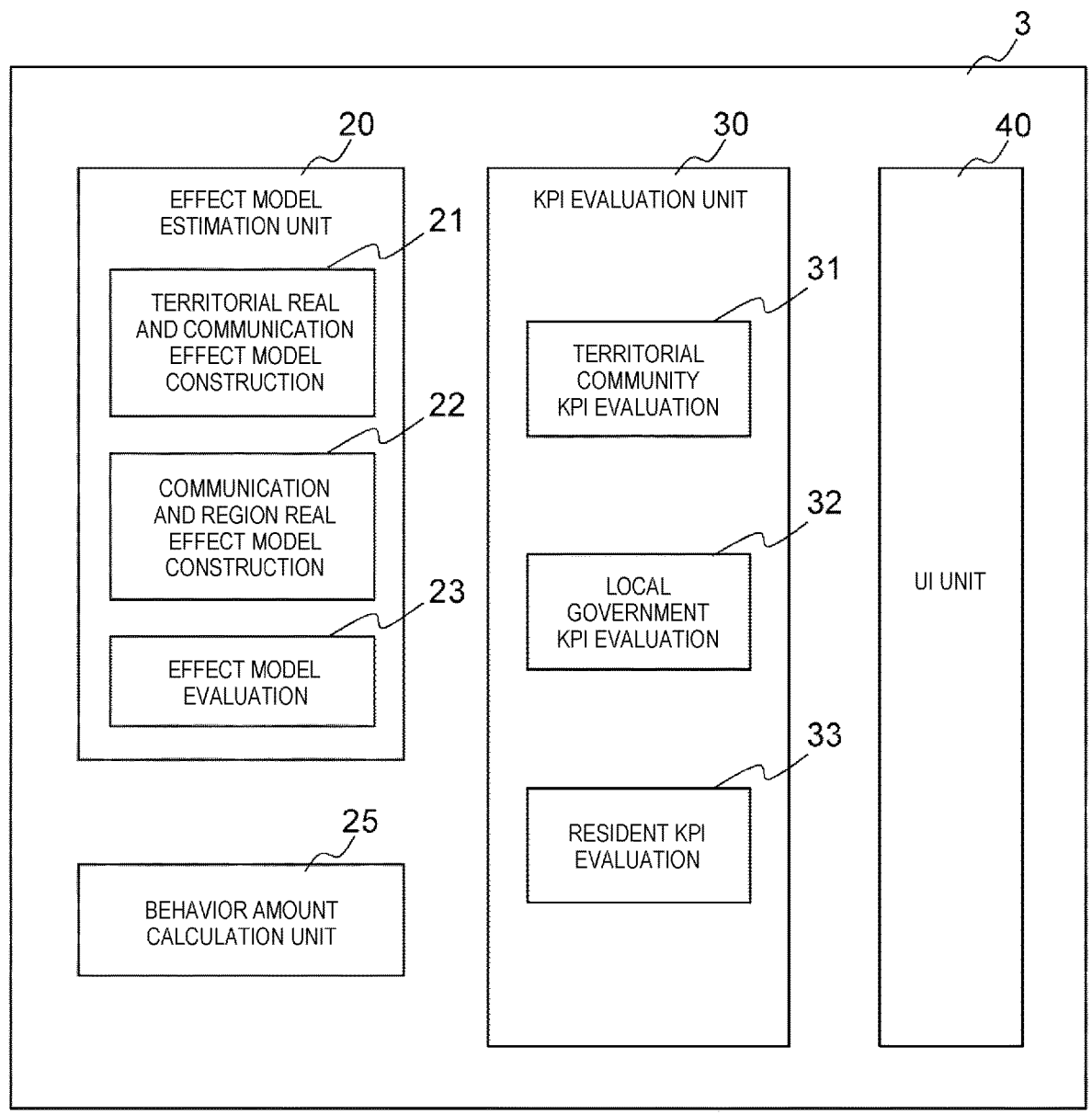

[FIG. 5]
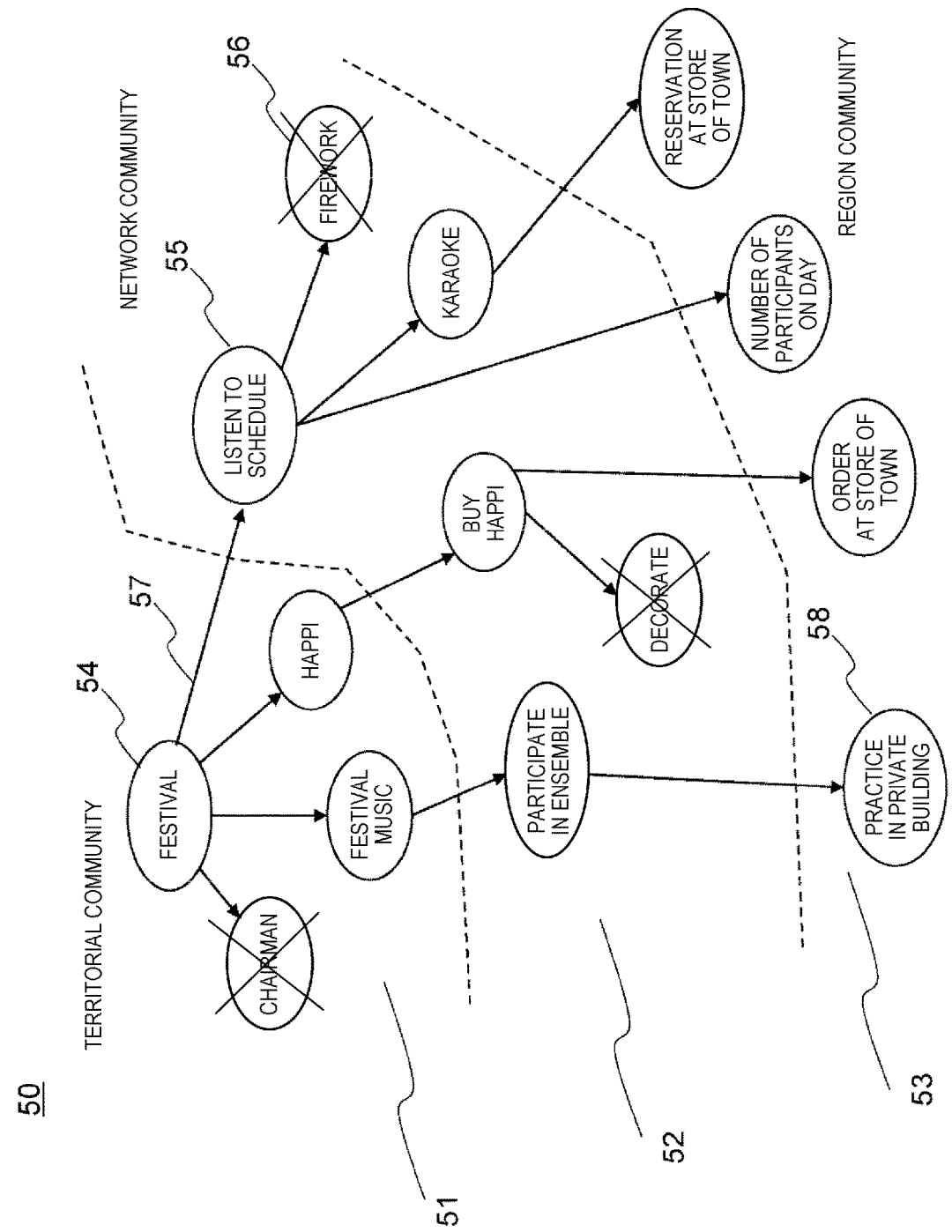

[FIG. 6A]
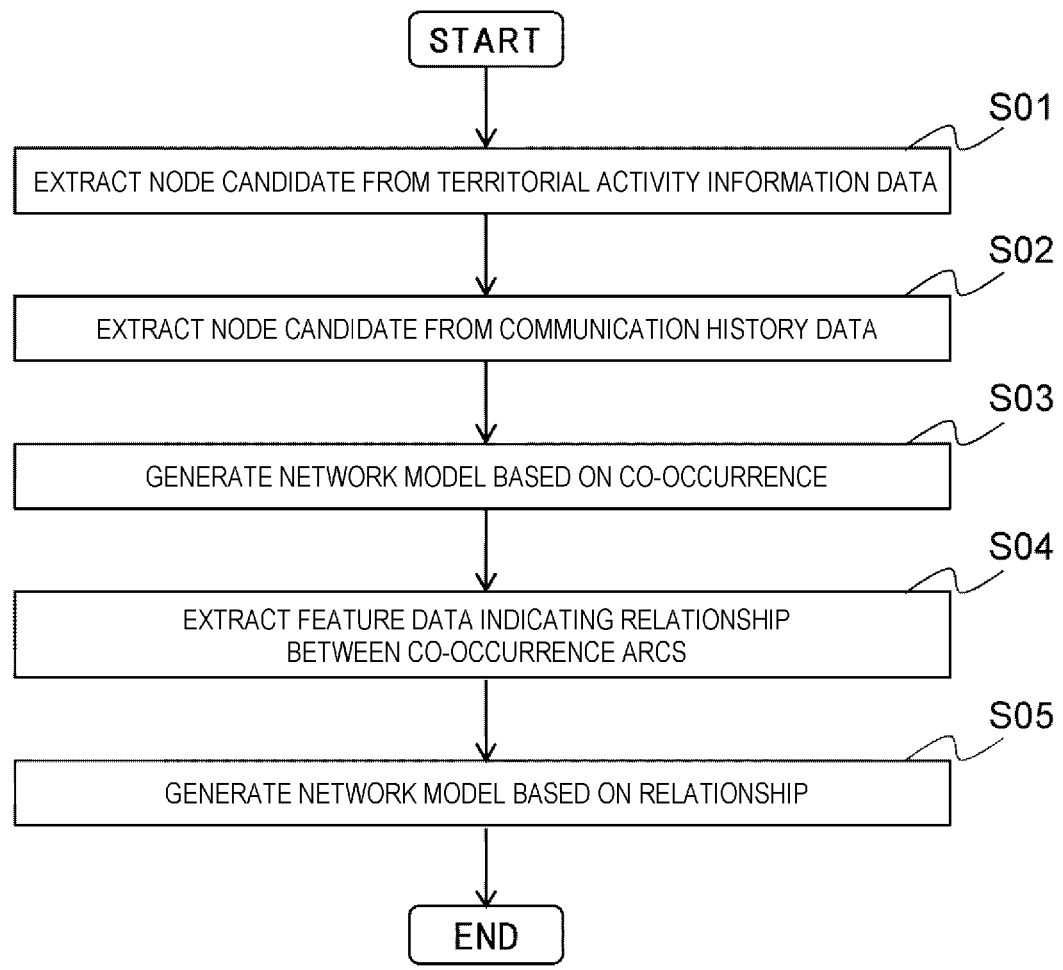

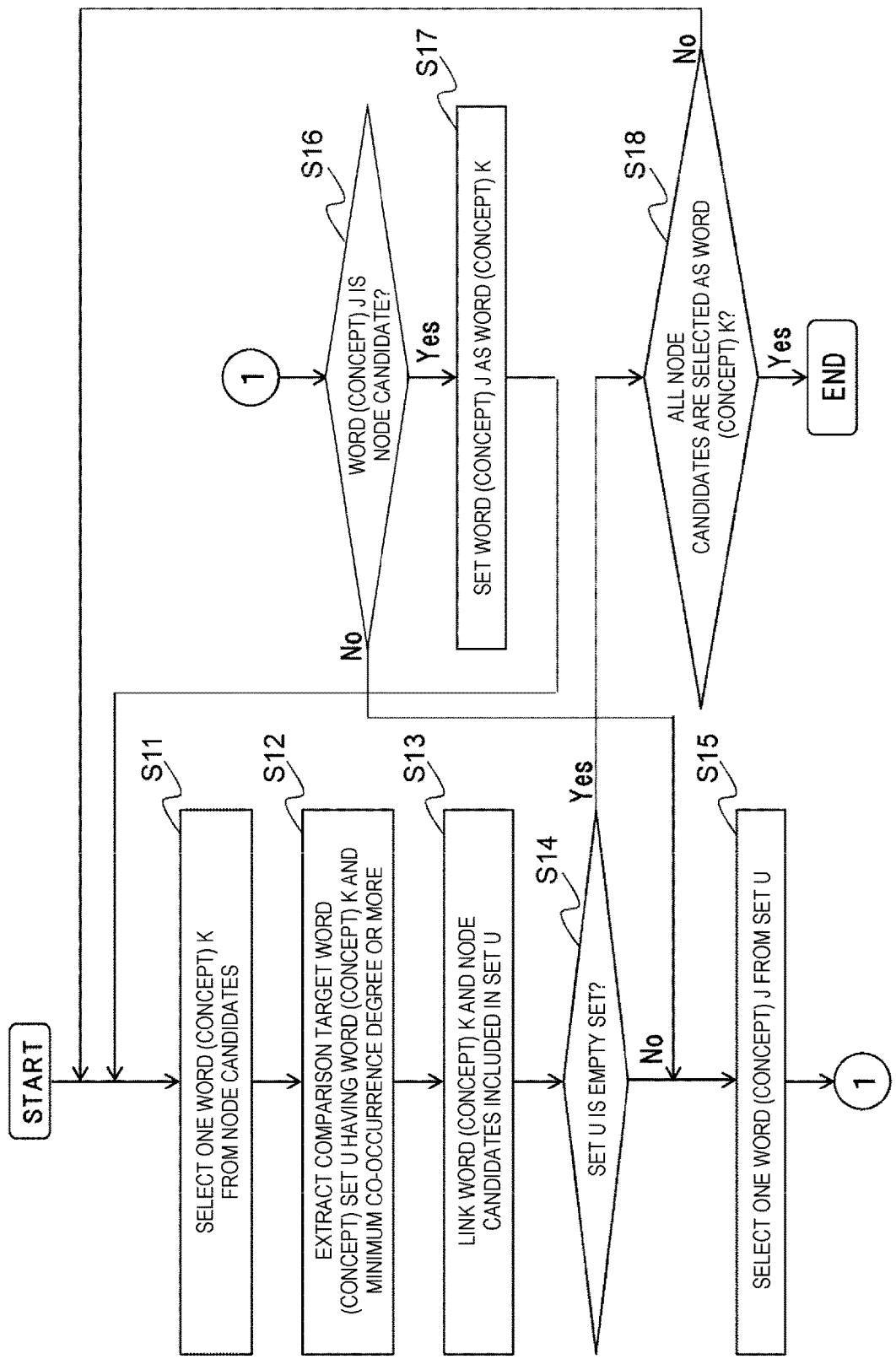
[FIG. 6B]

[FIG. 6C]
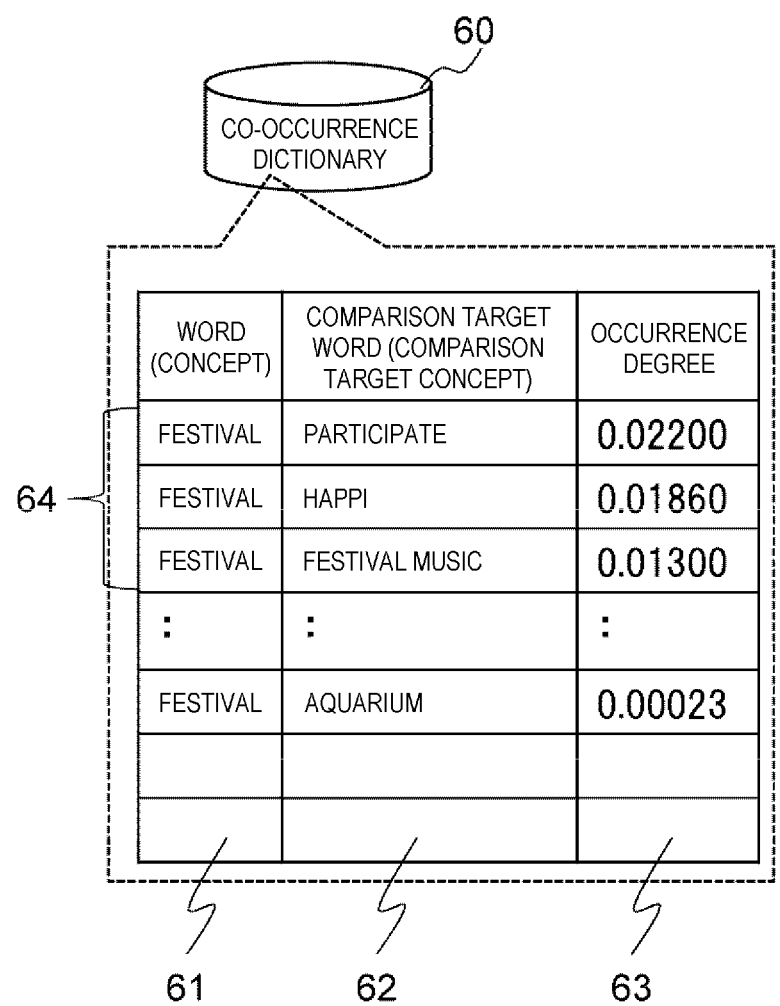

[FIG. 7]
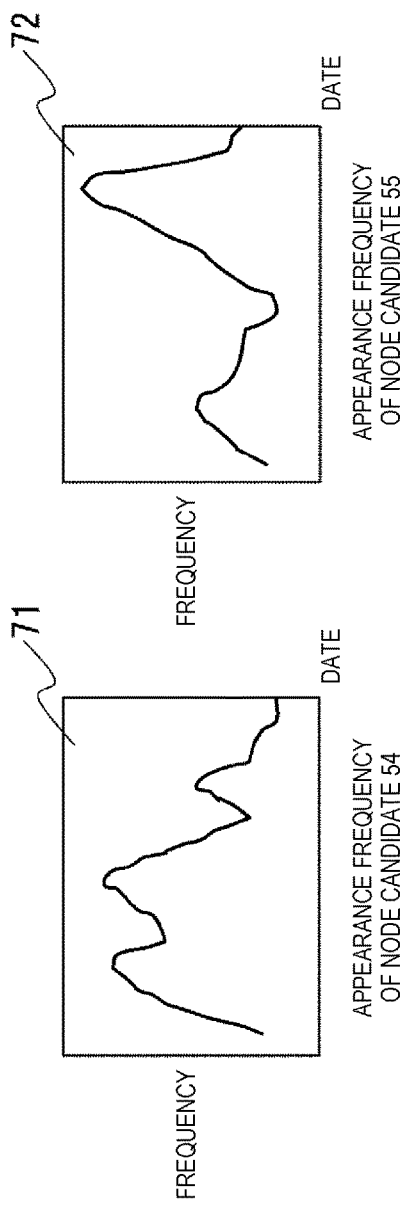
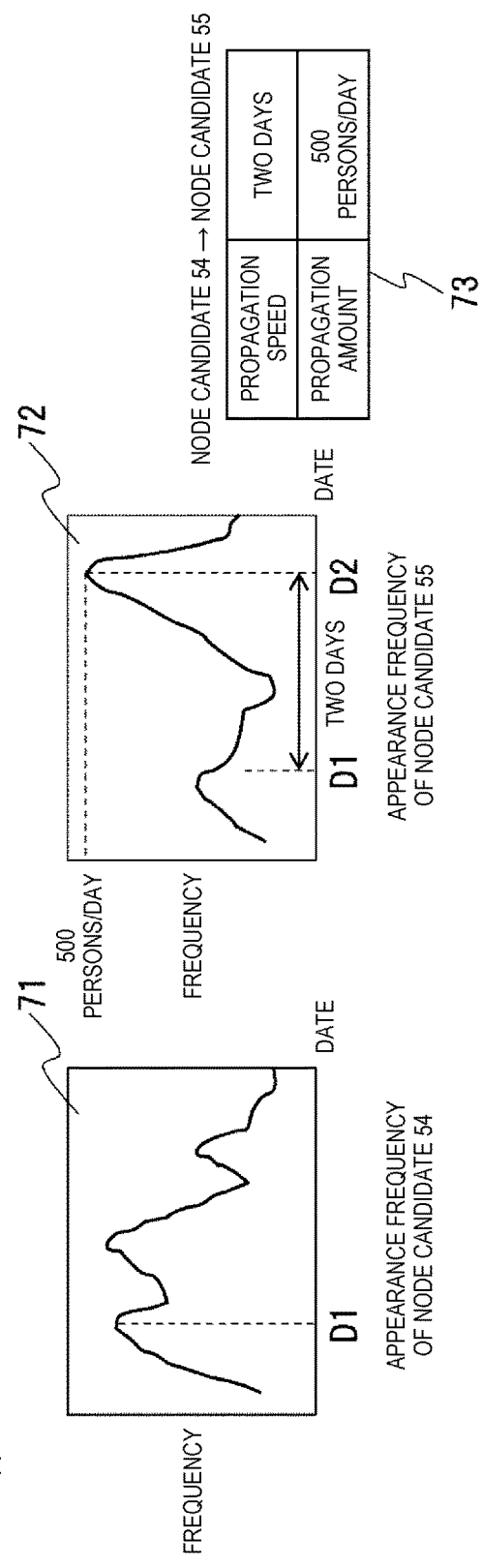

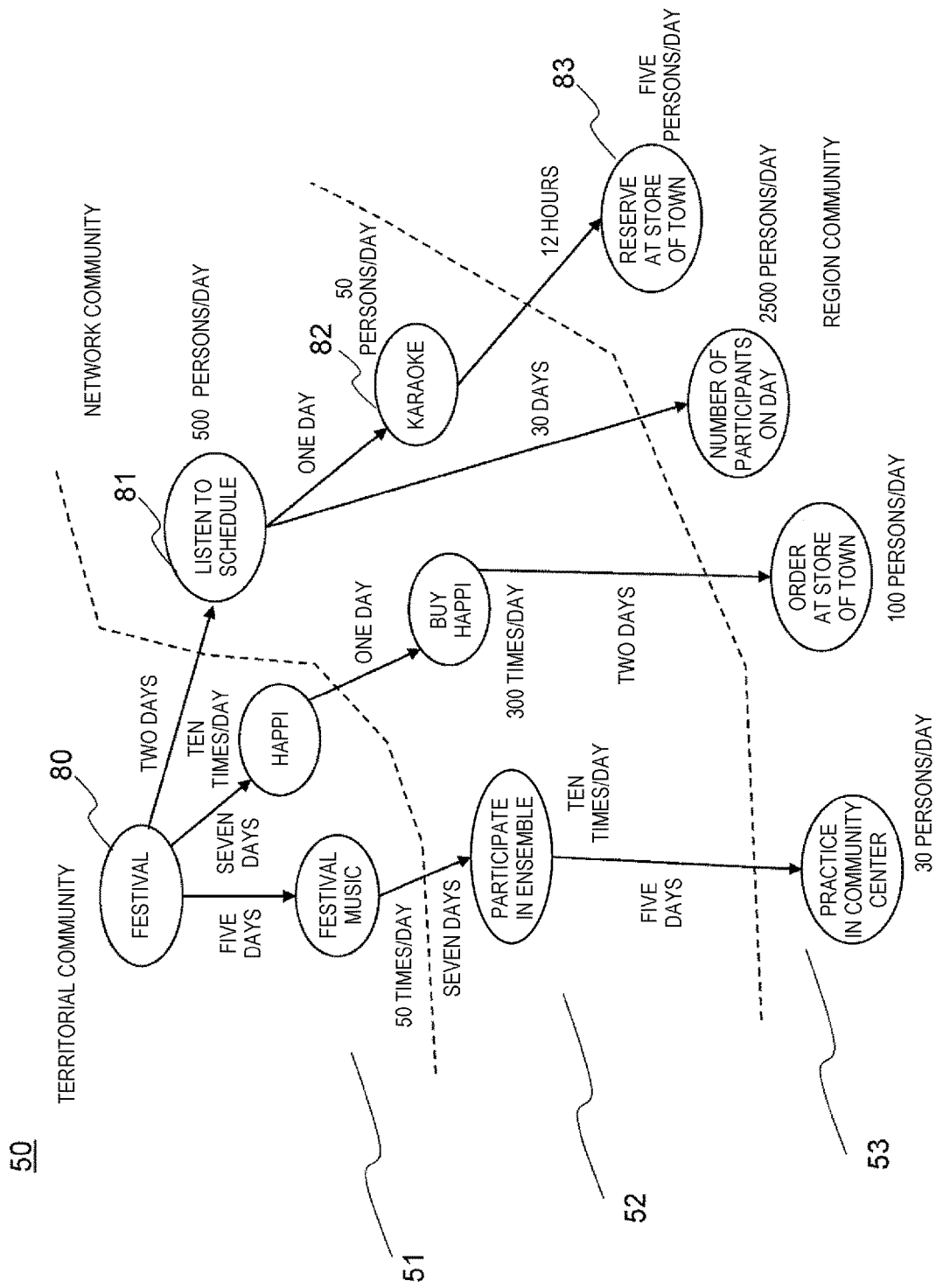

| NODE | EVALUATION VALUE V | UNIT |
|---|---|---|
| RESERVE AT STORE OF TOWN | 1.43 | PERSON/DAY |
| KARAOKE | 16.67 | PERSON/DAY |
| LISTEN TO SCHEDULE | 250 | PERSON/DAY |
| FESTIVAL MUSIC | 10 | TIME/DAY |
| PARTICIPATE IN ENSEMBLE | 0.83 | TIME/DAY |
| ⋮ | ⋮ | ⋮ |

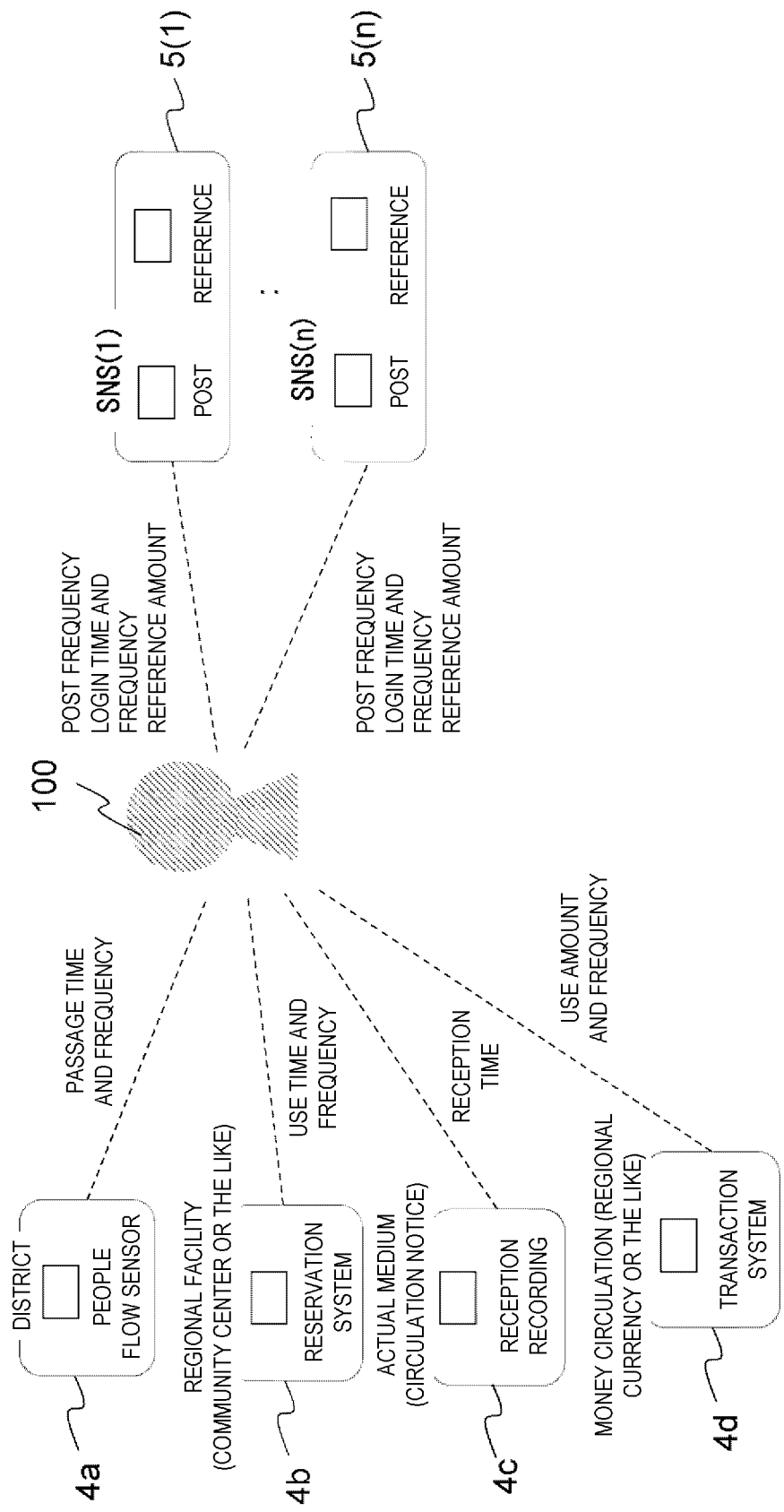

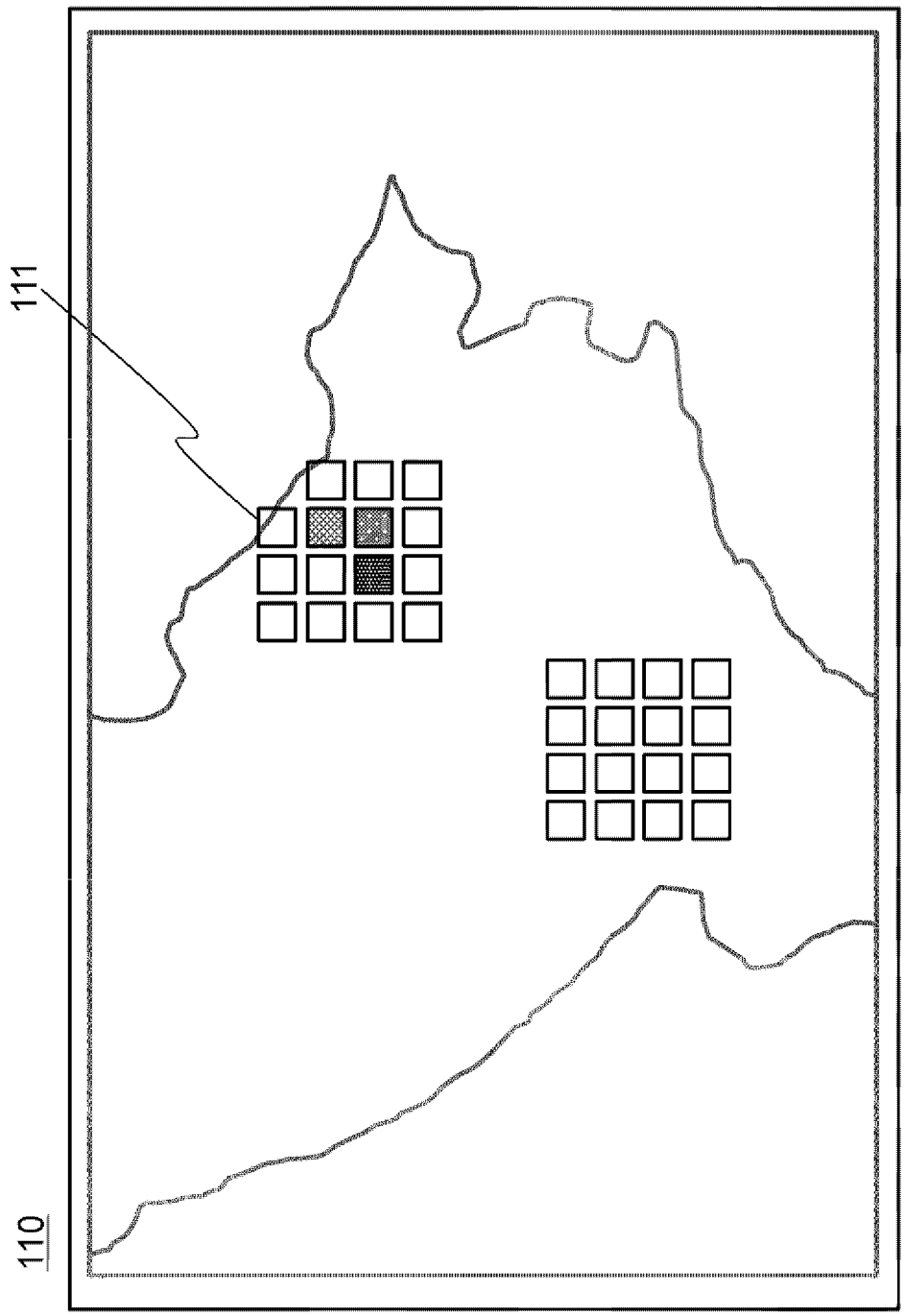
[FIG. 11]

| DATA TYPE | SENSING | KPI FLAG |
|---|---|---|
| DISTRICT | PEOPLE FLOW | ○ |
| REGION RESOURCE | RESERVATION | ○ |
| MONEY CIRCULATION | TRANSACTION | × |
| ⋮ | | |

121　　　　122　　　　123

COMMUNITY EVALUATION SYSTEM, COMMUNITY EVALUATION METHOD, BEHAVIOR EVALUATION SYSTEM, AND BEHAVIOR EVALUATION METHOD

TECHNICAL FIELD

The present invention relates to a community evaluation system, a community evaluation method, a behavior evaluation system, and a behavior evaluation method.

BACKGROUND ART

Along with a change in the mode of living or the mode of production, a community surrounding people changes. In a traditional society in which a broadcast communication technology is not developed, the community may almost be a community (referred to as "territorial community") of people actually living in the region. After that, the expansion of the secondary industry and the tertiary industry, the development of market economy, the development of cities, or the like advanced the nuclear family structure, and generally work in a direction of weakening the belonging feeling and involvement to a region where a user lives. Meanwhile, a new community, for example, a community of people working in the same workplace or a community of people having the same hobby is created, and it is considered that the number of people having a feeling of belonging to these communities stronger than a feeling of belonging to the territorial community is not small at present.

However, social problems such as the lack of children and the aging of population and frequent occurrence of natural disasters cause people to re-recognize the importance of communities that are relocated in regions where people relocate. It is expected that, if an activity in a constant locator region by people present in a certain region is activated, the region is likely to stay, and further, the activity leads to persistent activation of the region.

PTL 1 discloses a platform that provides a method for accessing a digital community.

PTL 2 discloses an information processing device that generates a community including users having a common topic from profiles of a plurality of users.

CITATION LIST

Patent Literature

PTL 1: JP2018-106669A
PTL 2: JP2017-228004A

SUMMARY OF INVENTION

Technical Problem

In order to activate a community in a region, an attempt is started to reconsider an activity for strengthening a connection between people who relocate in the region and actively activate the community which is relocated in region. For example, there is an attempt to intentionally activate a connection of constant locators through an event such as a festival.

As a method of evaluating results of these attempts, for example, it is conceivable to take a questionnaire to participants. However, since the aim of these attempts is to activate the region as a result of widening or deepening the connection between people in the region, it is desirable not only to perform subjective evaluation but also to continuously perform evaluation by objective and quantitative indices as to how much the connection between people is improved by the attempts. By visualizing the results of the attempts using the objective index on a time axis, it is possible to evaluate the activity from the viewpoint of the growth of the community. Alternatively, it is expected that an improvement point of the activity becomes clear.

PTL 1 and PTL 2 both relate to a community in a network space, and do not particularly consider an interaction with a real world.

Solution to Problem

A community evaluation system according to an embodiment of the invention is a community evaluation system for evaluating an effect of a specific activity of a first community on an activity of a second community, and the community evaluation system includes: a storage unit configured to store activity information data indicating an activity status of the specific activity of the first community, history data indicating the activity of the second community, and communication history data in a network community in which at least members of the second community participate; an effect model construction unit configured to construct, based on the activity information data, the history data, and the communication history data stored in the storage unit, an effect model indicating a process in which the specific activity of the first community is reflected in communication in the network community and the communication in the network community is reflected in the activity of the second community; and an effect model evaluation unit configured to calculate an evaluation value of the process in the effect model, based on a size and a delay of a connection between the specific activity of the first community and the communication in the network community, and a size and a delay of a connection between the communication in the network community and the activity of the second community.

A behavior evaluation system according to another embodiment of the invention is a behavior evaluation system for evaluating a behavior of a member of a community, and behavior evaluation system includes: a storage unit configured to store history data indicating an activity of the community and communication history data in a network community in which at least members of the community participate; a behavior amount calculation unit configured to calculate a first behavior amount of the member in the community based on the history data stored in the storage unit and calculate a second behavior amount of the member in the network community based on the communication history data stored in the storage unit; and a KPI evaluation unit configured to calculate a predetermined KPI based on the first behavior amount and the second behavior amount calculated by the behavior amount calculation unit.

Advantageous Effects of Invention

It is possible to evaluate intra-community interactions using objective and quantitative indices, and furthermore perform the evaluation continuously.

Other technical problems and novel characteristics will be apparent from a description of the present specification and the accompanying drawings.

BRIEF DESCRIPTION OF DRAWINGS

FIG. 1 is a diagram showing a state in which an activity of a territorial community changes a region community.

FIG. 2 is a block diagram of a community evaluation system.

FIG. 3 shows an example of data stored in a storage unit 2.

FIG. 4 is a functional block diagram of a data processing server 3.

FIG. 5 shows an example of an effect model.

FIG. 6A shows a creation flow of a network model based on a relationship.

FIG. 6B shows a creation flow of the network model based on a co-occurrence.

FIG. 6C shows a data structure of a co-occurrence dictionary.

FIG. 7 is a diagram showing a method of calculating feature data indicating the relationship in the effect model.

FIG. 8 shows an example of the effect model to which the feature data indicating the relationship is added.

FIG. 9 shows an example of an evaluation value table.

FIG. 10 is a diagram showing a behavior amount calculated by a behavior amount calculation unit.

FIG. 11 shows an example of a heat map indicating a variation of a local government KPI.

FIG. 12 shows an example of a designation table.

DESCRIPTION OF EMBODIMENTS

First Embodiment

In a first embodiment, a description will be given to a method of continuously evaluating how an activity of a community (referred to as a territorial community) which is relocated in a region changes a connection of people in the region and how the changed connection changes a community of the region (region community) by an objective and quantitative index. The territorial community is, for example, an organization such as a neighborhood association, and is an organization, for the purpose of activity, performing a specific activity for activating the region. As long as the organization performs a specific activity for activating the region, the organization may be an organization that is continuously active or an organization that is temporarily active. Meanwhile, the region community is a set of residents in here and has at least a gentle connection, and the purpose and the presence or absence of an activity as a group do not matter. It is assumed that the members of the territorial community are members of the region community in many cases, but it is not a condition that the members of the territorial community are members of the region community.

FIG. 1 shows one scenario in which the specific activity of the territorial community changes an activity of the region community. A neighborhood association, which is the territorial community, plans and executes a festival (specific activity) in a region, and activates the region through the festival. First, (1) in a planning stage, a closed activity mainly proceeds to the neighborhood association. (2) When the procedure shifts to a preparation stage, a contact point occurs between the outside and the neighborhood association using the festival as a key, such as a cooperator outside the neighborhood association that cooperates with the preparation of the festival or a prospective participant in the festival. (3) On the day of the festival, a person connection is expanded by participation in the festival of the residents and diffusion of festival bustling through an SNS or the like. (4) Thereafter, a behavioral change occurs in the residents through the person connection formed through the festival, and the region is activated. An object of a community evaluation system according to the first embodiment is to measure and evaluate how or how much the activity of the region community is changed in the activity of the territorial community. Alternatively, the evaluation is performed by comparing the change in the festival of this year with the change in the festival of last year. Then, the evaluation result is displayed to the members of the territorial community and the members of the region community in an easy-to-understand manner, and further feedback to the behavioral change is enabled.

FIG. 2 shows the community evaluation system. First, features of the system will be outlined. First, in the above-described example, an evaluation target is not the festival, that is, the activity itself of the territorial community, but the extent to which the activity of the territorial community contributes to the activation of the region community. Therefore, a change (for example, an interaction activity, use of a regional service, or consumption in a region) in the activity of the residents through the festival is the evaluation target. Therefore, the community evaluation system according to the embodiment widely collects real data related to the activity of the region community.

In addition, in the evaluation, it is necessary to estimate what kind of action the specific activity of the territorial community actually gives to the change of the activity of the region community. Therefore, communication history data in a network community such as an SNS in which at least residents participate is used. With the widespread use of smartphones and tablets, network communities formed by these communication tools have significantly increased effect on information sharing and behaviors of people over years. Therefore, in the system, the process of FIG. 1 is modeled as a process in which the real activity by the territorial community is reflected in the communication in the network community and a process in which the communication in the network community is reflected in the change of the real activity in the region community (this model is referred to as an effect model), and a size of the specific activity of the territorial community given to the change to the activity of the region community is evaluated using a size of transmission through these processes and the speed of the transmission as indices.

In the community evaluation system shown in FIG. 2, a data collection server 1, a data processing server 3, a real data collection system 4, and a communication system 5 are communicably connected to each other via a network 6. The data collection server 1 collects and manages information from the real data collection system 4 and the communication system 5 in the region community and the network community, which are evaluation targets, and stores the collected data in a storage unit 2. The storage unit 2 may be an on-premises storage and store the collected data, or the storage unit 2 may be an object storage on a cloud and store a data path for accessing the collected data in a storage device of the data collection server 1. Real data to be collected is determined in accordance with an actual condition of the region community which is the evaluation target, and the real data collection system 4 is selected in accordance with the determined real data. Since a real data collection system is different depending on a type of real data to be collected, the real data collection systems 4 having different types of the collected data may be denoted by reference numerals a to z. The data processing server 3 executes the evaluation as described above using the data stored in the storage unit 2.

FIG. 3 shows an example of data stored in the storage unit 2. A content of the data is an example, and data collected through the real data collection system 4 and the communication system 5 constituting the community evaluation system is stored. The data may be stored in a state in which preprocessing such as anonymization is performed.

Territorial activity information data 11 is data collected from a territorial community monitor system, which is the real data collection system 4, and is data representing an activity content of the territorial community. The territorial activity information data 11 includes, for example, a character transcription (dictation) of meeting in a neighborhood association, a conference record, or a communication history of members in the neighborhood association.

Data 12 to data 15 are examples of data collected as data representing the activity of the region community. The people flow and vehicle flow information data 12 is data of a people flow rate and a vehicle flow rate measured by a people flow sensor or a vehicle flow sensor disposed in a region, which is the real data collection system 4. The use history data 13 is reservation and use data of a community center or the like obtained from a reservation system of a regional facility or the like, which is the real data collection system 4. The order history data 14 is order history data obtained from an order reception system for managing reservations and orders for regional stores, which is the real data collection system 4. The transaction history data 15 is transaction history data of regional currency obtained from a region currency management system for managing the regional currency, which is the real data collection system 4. These data are selected as data indicating activities in the region community. Depending on the actual condition of the region community, data other than those exemplified may be collected, and the exemplified data may or may not be collected.

Communication history data 16 is data collected from the communication system 5, and is communication history data such as posting or reference on the network community, for example, an SNS.

FIG. 4 is a functional block diagram of the data processing server 3. Hardware of the data processing server 3 is an information processing device including a storage device such as a hard disk drive (HDD) or a solid state drive (SSD). In FIG. 4, functions executed by the data processing server 3 are represented by the functional block diagram, and each function is implemented by loading a software program code into a main memory and executing the loaded program code by a processor. The function implemented by the information processing device by the program may be referred to as a "unit" in the embodiment. The data processing server 3 may be implemented by a distributed processing server, and is not limited to a physical configuration of the hardware. An activity evaluation of the community is achieved by using each function of the data processing server 3.

(1) Effect Model Estimation Unit 20

An effect model estimation unit 20 constructs an effect model and performs evaluation based on the effect model using the data stored in the storage unit 2 in order to evaluate a change in the activity of the region community through the specific activity of the territorial community. FIG. 5 shows an effect model 50 constructed by the effect model estimation unit 20. The effect model 50 includes three layers 51 to 53. The first layer 51 is a network model indicating the specific activity of the territorial community constructed based on the territorial activity information data 11. A word (concept) appearing in the territorial activity information data 11 is assumed to be a node, and a relationship between nodes is represented by an arc (arrow). The second layer 52 is a network model indicating a content of communication in the network community constructed based on the communication history data 16. A word (concept) appearing in the communication history data 16 is assumed to be a node, and a relationship between nodes is represented by an arc. The third layer 53 is a node group indicating activities of the region community. The node group is set from the data 12 to 15 indicating the activities of the region community. A territorial real and communication effect model construction unit 21 constructs the network models of the first layer and the second layer, and a communication and region real effect model construction unit 22 constructs the network models of the second layer and the third layer.

(1a) Territorial Real and Communication Effect Model Construction Unit 21

FIG. 6A shows a network model (first and second layers) creation flow in the territorial real and communication effect model construction unit 21. First, node candidates are extracted from the territorial activity information data 11 (S01). Morphological analysis is performed on the territorial activity information data 11, and a word (concept) that is related to the specific activity of the territorial community and appears a predetermined number of times or more in the territorial activity information data is extracted and set as a node candidate in the first layer 51. Subsequently, node candidates are extracted from the communication history data 16 (S02). Similarly, morphological analysis is performed on the communication history data 16, and a word (concept) appearing a predetermined number of times or more in the communication history data is extracted and set as a node candidate in the second layer 52.

Subsequently, for the node candidates extracted in steps S01 and S02, a network model based on a co-occurrence is generated using a co-occurrence dictionary (S03). Here, the network model based on the co-occurrence refers to a network model in which arcs between nodes are set based on a co-occurrence of words (concepts) indicated by the nodes. The details of step S03 are shown in FIG. 6B, and a data structure of a co-occurrence dictionary 60 used in step S03 is shown in FIG. 6C.

The co-occurrence dictionary 60 indicates the ease of use as a set of words (concepts) in the same sentence from a large amount of sentence data. The sentence data used to create the co-occurrence dictionary 60 is, for example, sentence data collected from a general book, newspaper, Web site, or the like, and does not necessarily have a relationship with a region, a community, or the like which is an evaluation target. The co-occurrence dictionary 60 has, for example, a table format as shown in FIG. 6C, and includes a word (concept) column 61, a comparison target word (concept) column 62, and a co-occurrence degree column 63. The co-occurrence degree represents a probability that the word (concept) and the comparison target word (concept) appear in the same sentence.

A network model based on the co-occurrence is generated by using the co-occurrence dictionary 60. First, one word (concept) K is selected for the node candidates extracted in steps S01 and S02 (S11), the co-occurrence dictionary 60 is searched, and a comparison target word (concept) set U having the word (concept) K and a predetermined minimum co-occurrence degree or more is extracted (S12). For example, when the word (concept) K is "festival" and the predetermined minimum co-occurrence degree is 0.01300, in the case of the co-occurrence dictionary 60 of FIG. 6C, a comparison target word (concept) of a record group 64 is extracted as the set U. Subsequently, the word (concept) K and node candidates included in the set U are linked (S13). Since the link is based on the co-occurrence, the link is referred to as a co-occurrence arc. If the set U is not an empty set (No in S14), one word (concept) J is selected from the set U (S15). If the selected word (concept) J is not a node candidate (No in S16), another word (concept) is selected as the word (concept) J, the selected word (concept) J is set as the word (concept) K (S17), and the processing is repeated from step S11.

As a result, if the set U is an empty set (Yes in S14), it is checked whether all the node candidates are selected as the word (concept) K (S18). If all the node candidates are selected, the processing ends, and if there is a word (concept) that is not selected, the word (concept) is selected as the word (concept) K, and the processing is repeated from step S11.

A network model based on the relationship is generated from the network model based on the co-occurrence generated in the above manner. First, in step S04 (FIG. 6A), feature data indicating a relationship between co-occurrence arcs is extracted. Calculation of the feature data is performed for all co-occurrence arcs of the network model generated in step S03.

FIG. 7 shows an example in which feature data indicating a relationship is calculated for a co-occurrence arc 57 (see FIG. 5) linking a node candidate 54 and a node candidate 55. The feature data indicating the relationship is a propagation speed (delay time) and a propagation amount of information. First, an appearance frequency per unit time (for example, one day) of an event indicated by a node candidate is extracted as the propagation amount. Since the node candidate 54, which is a start point of the co-occurrence arc 57 to be examined, is "festival", which is the node candidate in the first layer 51, a histogram 71 in which the word "festival" appears in the territorial activity information data 11 is created. Meanwhile, since the node candidate 55 which is an end point is "listen to schedule" which is the node candidate in the second layer 52, a histogram 72 in which a concept of "listen to schedule (on day of festival)" appears in the communication history data 16 is created.

Peaks of the created histograms are extracted, and a propagation speed can be obtained based on a delay time between the peak of the histogram 71 and the peak of the histogram 72. As described above, a propagation speed and a propagation amount of information are extracted for each co-occurrence arc. In the example of FIG. 7, two days, which is a difference between D1 which is the peak of the histogram 71 and D2 which is the peak of the histogram 72, is the propagation speed, and 500 persons/day, which is an appearance frequency of "listen to schedule (on day of festival)" in D2, is the propagation amount.

In step S05 (FIG. 6A), the relationship between the co-occurrence arcs is evaluated based on the feature data indicating the relationship between the co-occurrence arcs, and a network model based on the relationship is generated. That is, it can be evaluated that a relationship of information is high when both the propagation speed and the propagation amount are large, and the relationship of information is low when both or one of the propagation speed and the propagation amount is small. Therefore, in the network model based on the co-occurrence, the co-occurrence arc evaluated as having a high relationship is remained as it is as relationship arcs, and the co-occurrence arc evaluated as having a low relationship is deleted, thereby generating a network model based on the relationship.

(1b) Communication and Region Real Effect Model Construction Unit 22

A network model (second and third layers) creation flow in the communication and region real effect model construction unit 22 is the same as the creation flow of the territorial real communication effect model construction unit 21, and thus redundant description will be omitted, and differences will be mainly described.

A node candidate in the second layer 52 is obtained from the network model created by the territorial real and communication effect model construction unit 21. A node candidate in the third layer 53 is set based on data collected as data representing the activity of the region community. For example, a node candidate 58 ("practice in community center") shown in FIG. 5 is set based on a use history of a community center included in the use history data 13.

For the set node candidate in the second layer 52 and the set node candidate in the third layer 53, the same processing as that of the territorial real and communication effect model construction unit 21 is performed, and a network model based on the relationships in the second layer 52 and the third layer 53 is generated.

Furthermore, the communication and region real effect model construction unit 22 integrates the network model (first and second layers) constructed by the territorial real and communication effect model construction unit 21 and the network model (second and third layers) constructed by itself to construct the effect model shown in FIG. 5. At this time, the two network models are integrated, and node candidates that are not linked by a relationship arc from any node candidate in the first layer 51 to any node candidate in the third layer 53 are deleted (referred to as pruning). Accordingly, an effect model from the specific activity of the territorial community to the activity of the region community through the communication of the network community is created. In FIG. 5, the pruned node candidates are indicated by x marks.

(1c) Effect Model Evaluation Unit 23

The effect model evaluation unit 23 calculates an evaluation value V of each node in the effect model 50. FIG. 8 shows a propagation amount of each node and a propagation speed (shown as delay time here) of each arc in the effect model 50 shown in FIG. 5. In the effect model, a node that is not an end point of an arc is referred to as a root node ("festival" in this example), and a delay time from the root node to a node through an intermediate node and an arc is referred to as a total delay time. At this time, it is defined as the evaluation value V of each node=propagation amount/total delay time. Since the evaluation value V increases as the propagation amount increases and the total delay time decreases, the evaluation value V can be used as an index indicating closeness between activities.

For example, in the example of FIG. 8, an evaluation value V81 of a node 81 is 500/2=250 persons/day, an evaluation value V82 of a node 82 is 50/(2+1)=16.67 persons/day, and an evaluation value V83 of a node 83 is 5/(2+1+0.5)=1.43 persons/day.

(2) KPI Evaluation Unit 30

A territorial community KPI evaluation unit 31 of the KPI evaluation unit 30 determines a predetermined key performance indicator (KPI) in advance from the effect model constructed by the effect model estimation unit 20 and the evaluation value V thereof, and evaluates a contribution to the activation of the region community due to the specific activity of the territorial community, for example, by performing fixed point observation for a festival of every year.

In one KPI example, the evaluation value V itself is used. FIG. 9 shows an evaluation value table 90 in which the evaluation value V of each node of the effect model 50 is displayed in a table format. The KPI can be set as a value of the evaluation value V of the evaluation value table 90. It is considered that the propagation amount and/or the propagation speed of the node having the larger evaluation value V is increased, and it can be evaluated that the contribution to the activation of the region community is increased. In addition, the KPI may be set as the number of records of the evaluation value table 90 (that is, the number of nodes in the effect model). In this case, an increase in the number of records in the evaluation value table 90 means that an information transmission path is diversified, and it can be evaluated that the region community is activated.

In addition, a new index based on the evaluation value V may be created as the KPI. For example, an effect degree E, which is an index indicating how much the root node 80 ("festival") is affected by the activity of the region community such as the node 83 ("reserve at store of town"), is defined as a sum of the evaluation values V of all the nodes included in the path. In the example of FIG. 8, it is calculated that the effect degree E=268.1 persons/day. A node such as the node 83 that is not a start point of an arc is referred to as an edge node, and similarly, the effect degree E is calculated for each edge node of the third layer 53. Depending on the edge node, a unit of the propagation amount may be different in a node in the middle of a path from the root node 80 to the edge node. In this case, since a simple sum cannot be obtained, the effect degree E may be defined as a combination of the evaluation values V having different unit amounts.

It is possible to evaluate an effect of the activity of the territorial community on the activity of the region community by using the effect degree E. For example, the effect degree E between the same root node and the same edge node is compared in a festival of every year. When the effect degree E is large, it can be evaluated that an effect of the specific activity of the territorial community is large, even if an information propagation amount in a process from the root node to the edge node is large or an information propagation speed is high. In addition, since the effect degree E reflects a size of the number of persons involved in activation of a region, the effect degree E can also be used as an index of the activation of the region.

Second Embodiment

In a second embodiment, a description will be given to a method of continuously evaluating how residents are connected to an external society by an objective and quantitative index. A description overlapping with that of the first embodiment will be omitted.

(1) Behavior Amount Calculation Unit 25

In the second embodiment, a behavior amount indicating a method in which the residents are connected to the external society is calculated. A behavior amount calculated by a behavior amount calculation unit 25 will be described with reference to FIG. 10. The behavior amount calculation unit 25 obtains, for each resident 100, activity information in a region community of the resident 100 from the real data collection system 4, and activity information in a network community of the resident 100 from the communication system 5. As shown in FIG. 10, there is a possibility that the residents 100 belong to a plurality of network communities. The information from the real data collection system 4 indicates a connection with the real region community where the user resides, and the information from the communication system 5 indicates a connection with the network community. Therefore, a behavior amount A of the residents is calculated for each type of collected data.

Although the behavior amount A needs to be defined for each type of the collected data, for example, when a passage time and a frequency of the residents 100 are measured by a people flow sensor in a district, the behavior amount A can be defined as the behavior amount A=passage time x frequency based on the passage time and the frequency of the residents 100 within a measurement period T. FIG. 10 shows an example of data for defining the behavior amount A for each type of the collected data. A system configuration of a behavior evaluation system that executes the processing of the second embodiment is the same as that of FIG. 2. The collected data from the real data collection system 4 and the communication system 5 is stored in the storage unit 2, and the behavior amount is calculated using the data stored in the storage unit 2.

(2) KPI Evaluation Unit 30

(2a) Local Government KPI Evaluation Unit 32

A local government KPI evaluation unit 32 of the KPI evaluation unit 30 determines in advance, based on the behavior amount A, a KPI (referred to as a local government KPI) indicating a behavior status of a resident who resides in a predetermined region for each predetermined region, thereby evaluating a status of a region community, for example, whether the resident is isolated. By continuously monitoring the local government KPI as an average value of behavior amounts of residents who reside in the predetermined region, it is possible to continuously monitor whether residents have lost contact points with the external society. At this time, the behavior amounts calculated by the behavior amount calculation unit 25 includes a first behavior amount indicating a behavior in the region community and a second behavior amount indicating a behavior in the network community. In the local government KPI, the behavior amounts may be evaluated in the same manner, or may be evaluated with a specific gravity given to one of the behavior amounts.

A user interface (UI) unit 40 displays a temporal change of the local government KPI as a heat map on a map of a region managed by the local government. An example of the heat map is shown in FIG. 11. In a heat map 110, blocks 111 indicating residential areas of residents are provided on a map indicating regions, and for example, colors of the blocks 111 are displayed darker as a decrease in a value of the local government KPI is larger. Accordingly, in the local government, a region where the local government KPI is lowered can be recognized, and measures such as increasing the number of watching trailers and proposing an event for strengthening connections of regions can be considered.

(2b) Resident KPI Evaluation Unit 33

A resident KPI evaluation unit 33 of the KPI evaluation unit 30 determines in advance, based on the behavior amount A, a KPI (referred to as a resident KPI) indicating a behavior balance between the region community and the network community, thereby evaluating a balance status between a connection of the region community and a connection of the network community with, for example, the residents himself/herself.

In this case, if there is an activity of a region community in which residents are not substantially involved, the meaning of the KPI index is reduced if the behavior amount is calculated including the activity. Therefore, the residents 100 designate collected data that is actually meaningful for the residents 100 among the data collected by the behavior evaluation system, and designate a behavior amount for the designated collected data so as to be used for calculation of the resident KPI. The residents 100 can be connected to a behavioral change by monitoring a temporal change of the resident KPI by the residents 100 themselves.

FIG. 12 shows an example of a designation table 120 for designating the collected data to be used for the resident KPI. A data type column 121 indicates a type of collected data (here, a real data collection system is designated), a sensing column 122 indicates sensing data collected by the real data collection system, and a KPI flag column 123 indicates whether the sensing data is used for calculation of the resident KPI.

Although the invention is described based on the embodiments and modifications, the invention is not limited to the embodiments and modifications described above, and various modifications are possible without departing from the scope of the invention. For example, although the region community is described as an example, the invention can be used for the purpose of evaluating an effect of one activity of any community, or one activity in a group, an organization, or a team on another activity, and grasping behaviors of members.

REFERENCE SIGNS LIST

1: data collection server
2: storage unit
3: data processing server
4: real data collection system
5: communication system
6: network
11: territorial activity information data
12: people flow and vehicle flow information data
13: use history data
14: order history data
15: transaction history data
16: communication history data
20: effect model estimation unit
21: territorial real and communication effect model construction unit
22: communication and region real effect model construction unit
23: effect model evaluation unit
25: behavior amount calculation unit
30: KPI evaluation unit
31: territorial community KPI evaluation unit
32: local government KPI evaluation unit
33: resident KPI evaluation unit
40: UI unit
50: effect model
60: co-occurrence dictionary
71, 72: histogram
90: evaluation value table
100: resident
110: heat map
120: designation table

The invention claimed is:

1. A community evaluation system for evaluating an effect of a specific activity of a first community on an activity of a second community, the community evaluation system comprising:
a storage unit configured to store activity information data indicating an activity status of the specific activity of the first community, history data indicating the activity of the second community, and communication history data in a network community in which at least members of the second community participate;
an effect model construction unit configured to construct, based on the activity information data, the history data, and the communication history data stored in the storage unit, an effect model indicating a process in which the specific activity of the first community is reflected in communication in the network community and the communication in the network community is reflected in the activity of the second community; and
an effect model evaluation unit configured to calculate an evaluation value of the process in the effect model, based on a size and a delay of a connection between the specific activity of the first community and the communication in the network community, and a size and a delay of a connection between the communication in the network community and the activity of the second community,
wherein
the effect model is a network model including a plurality of nodes and arcs linking the nodes and having a first layer to a third layer,
the first layer includes nodes indicating the specific activity of the first community, the second layer includes nodes indicating the communication in the network community, and the third layer includes nodes indicating the activity of the second community,
a node of the first layer is linked to another node of the first layer or a node of the second layer, and a node of the second layer is linked to another node of the second layer or a node of the third layer,
a node of the third layer, through the arcs and the nodes, reaches a root node which is not an end point of the arcs among the nodes of the first layer,
the effect model evaluation unit calculates an evaluation value for each of the nodes as the evaluation value of the process, and
the evaluation value of each node is calculated based on a size of a peak of a histogram of the node and a sum of delay times of arcs included in a path from the root node to the node.

2. The community evaluation system according to claim 1, wherein
the effect model construction unit creates, based on the activity information data, the history data, and the communication history data stored in the storage unit, histograms in which events indicated by the nodes appear, and the arcs of the effect model are determined such that both or at least one of a delay time between a peak of a histogram of a node serving as a start point of the arc and a peak of a histogram of a node serving as an end point of the arc and a size of the peak of the histogram of the node serving as the end point of the arc satisfies a predetermined condition.

3. The community evaluation system according to claim 1, further comprising:
a KPI evaluation unit configured to evaluate a contribution of the specific activity of the first community to the activity of the second community based on the evaluation value of the process calculated by the effect model evaluation unit, wherein
the specific activity of the first community is performed a plurality of times, and
the KPI evaluation unit compares a current evaluation value of the process for the specific activity of the first community with a previous evaluation value of the process for the specific activity of the first community.

4. The community evaluation system according to claim 1, further comprising:
a KPI evaluation unit configured to evaluate a contribution of the specific activity of the first community to the activity of the second community based on the evaluation value of the process calculated by the effect model evaluation unit, wherein the specific activity of the first community is performed a plurality of times, and the KPI evaluation unit compares a plurality of the specific activities of the first community based on the number of the nodes in the effect model and the evaluation value for each of the nodes.

5. A community evaluation method for evaluating an effect of a specific activity of a first community on an activity of a second community by using a community evaluation system including a storage unit and an information processing device, the community evaluation method comprising:

collecting activity information data indicating an activity status of the specific activity of the first community and storing the activity information data in the storage unit;

collecting history data indicating the activity of the second community and storing the history data in the storage unit; and collecting communication history data in a network community in which at least members of the second community participate, and storing the communication history data in the storage unit, wherein the information processing device constructs, based on the activity information data, the history data, and the communication history data stored in the storage unit, an effect model indicating a process in which the specific activity of the first community is reflected in communication in the network community and the communication in the network community is reflected in the activity of the second community, and the information processing device calculates an evaluation value of the process in the effect model, based on a size and a delay of a connection between the specific activity of the first community and the communication in the network community, and a size and a delay of a connection between the communication in the network community and the activity of the second community, wherein the effect model is a network model including a plurality of nodes and arcs linking the nodes and having a first layer to a third layer, the first layer includes nodes indicating the specific activity of the first community, the second layer includes nodes indicating the communication in the network community, and the third layer includes nodes indicating the activity of the second community, a node of the first layer is linked to another node of the first layer or a node of the second layer, and a node of the second layer is linked to another node of the second layer or a node of the third layer, a node of the third layer, through the arcs and the nodes, reaches a root node which is not an end point of the arcs among the nodes of the first layer, the effect model evaluation unit calculates an evaluation value for each of the nodes as the evaluation value of the process, and the evaluation value of each node is calculated based on a size of a peak of a histogram of the node and a sum of delay times of arcs included in a path from the root node to the node.

6. The community evaluation method according to claim 5, wherein the specific activity of the first community is performed a plurality of times, and the information processing device compares a current evaluation value of the process for the specific activity of the first community with a previous evaluation value of the process for the specific activity of the first community.

* * * * *